United States Patent
Scope et al.

(10) Patent No.: US 9,748,591 B2
(45) Date of Patent: *Aug. 29, 2017

(54) FILTERING DEVICE, IN PARTICULAR FOR THE AIR TO BE SUPPLIED TO A FUEL CELL

(71) Applicant: MANN+HUMMEL GMBH, Ludwigsburg (DE)

(72) Inventors: Andreas Scope, Freiberg (DE); Mathias Volk, Otterstadt (DE); Thomas Pemsel, Bad Berneck (DE); Ina Woitoll, Hemmingen (DE); Michael Fasold, Auenwald (DE); Dieter Weiss, Gefrees (DE); Karlheinz Muenkel, Oberderdingen-Flehingen (DE); Andreas Panni, Odenheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,595

(22) Filed: Oct. 10, 2016

(65) Prior Publication Data

US 2017/0077537 A1 Mar. 16, 2017

Related U.S. Application Data

(63) Continuation of application No. 14/795,229, filed on Jul. 9, 2015, now Pat. No. 9,466,850, which is a
(Continued)

(30) Foreign Application Priority Data

Jul. 12, 2012 (DE) .................. 10 2012 013 744

(51) Int. Cl.
*B01D 53/02* (2006.01)
*H01M 8/0662* (2016.01)
(Continued)

(52) U.S. Cl.
CPC .......... *H01M 8/0687* (2013.01); *B01D 39/08* (2013.01); *B01D 46/00* (2013.01); *B01D 53/02* (2013.01); *B01D 53/0407* (2013.01); *B01J 20/20* (2013.01); *B01J 20/28028* (2013.01); *B01J 20/324* (2013.01); *B01J 20/3212* (2013.01);
(Continued)

(58) Field of Classification Search
CPC .......... B01D 2253/102; B01D 2253/25; B01D 2253/34; B01D 53/02; B01D 53/0407; B01D 2239/0407; B01D 2239/0618; B01D 2239/065; B01D 2239/0654; B01D 2239/083; B01J 20/20; B01J 20/28028; B01J 20/3212; B01J 20/3223; B01J 20/324; H01M 8/0687
See application file for complete search history.

(56) References Cited

U.S. PATENT DOCUMENTS 4,510,193 A * 4/1985 Blucher .................. A62D 5/00
428/196
4,517,308 A * 5/1985 Ehlenz ................ A43B 1/0045
264/45.3
(Continued)

*Primary Examiner* — Christopher P Jones
(74) *Attorney, Agent, or Firm* — James Hasselbeck

(57) ABSTRACT

A filtering device features a carrier medium and activated carbon as adsorbent which is immobilized due to the addition of adhesive.

11 Claims, 1 Drawing Sheet

Related U.S. Application Data continuation of application No. 13/940,839, filed on Jul. 12, 2013, now Pat. No. 9,095,810.

(51) Int. Cl.

| | | |
|---|---|---|
| *B01D 53/04* | (2006.01) | |
| *B01J 20/20* | (2006.01) | |
| *B01J 20/28* | (2006.01) | |
| *B01J 20/32* | (2006.01) | |
| *B01D 39/08* | (2006.01) | |
| *B01D 46/00* | (2006.01) | |

(52) U.S. Cl.
 CPC ... *B01J 20/3223* (2013.01); *B01D 2239/0407* (2013.01); *B01D 2239/065* (2013.01); *B01D 2239/0618* (2013.01); *B01D 2239/0654* (2013.01); *B01D 2239/083* (2013.01); *B01D 2253/102* (2013.01); *B01D 2253/25* (2013.01); *B01D 2253/34* (2013.01); *B01D 2259/45* (2013.01); *Y02E 60/50* (2013.01)

(56) References Cited

U.S. PATENT DOCUMENTS

| | | | | |
|---|---|---|---|---|
| 5,792,513 | A * | 8/1998 | Koslow | A61F 13/15658 427/195 |
| 5,871,569 | A * | 2/1999 | Oehler | B01D 39/1676 210/502.1 |
| 6,024,782 | A * | 2/2000 | Freund | B01J 20/28004 427/202 |
| 6,391,429 | B1 * | 5/2002 | Senkus | A62B 23/02 428/198 |
| 7,063,733 | B2 * | 6/2006 | Mori | A61L 9/014 55/385.3 |
| 2009/0261032 | A1 * | 10/2009 | Gohle | A62B 23/00 210/490 |

* cited by examiner

FILTERING DEVICE, IN PARTICULAR FOR THE AIR TO BE SUPPLIED TO A FUEL CELL

CROSS REFERENCE TO RELATED APPLICATIONS

This application is a continuation of U.S. application Ser. No. 14/795,229, filed 9 Jul. 2015 which is a continuation of U.S. application Ser. No. 13/940,839, filed 13 Jul. 2013, now U.S. Pat. No. 9,095,810 issued: 4 Aug. 2015, which claims the benefit under 35 USC 119 of foreign application DE 10 2012 013 744.3 filed in Germany on Jul. 12, 2012.

TECHNICAL FIELD

The invention relates to a filtering device, in particular for the air to be supplied to a fuel cell or for filtering pesticides.

PRIOR ART

The U.S. Pat. No. 7,758,674 B2 describes a filtering device for the air to be supplied to a fuel cell. With the aid of the filtering device the air can be cleaned from contaminant particles as well as from chemical impurities. For this purpose, the filtering device features a filter fleece on which the contaminant particles are separated as well as a stratum of activated carbon, which serves as adsorbent for the adsorption of gaseous elements in the air.

SUMMARY OF THE INVENTION

The object of the invention is to design a filtering device, which features activated carbon as adsorbent, with simple measures in such a way that even over a long period of use a good degree of efficiency is ensured.

The filtering device according to the invention can be used to filter impurities chemically from a gas flow by way of adsorption. The filtering device is, for example, used for cleaning the air to be supplied to a fuel cell by adsorbing gaseous impurities in the air. The filtering device can also be used for filtering pesticides. The filtering device features, on the one hand, a carrier medium and, on the other hand, activated carbon as adsorbent which is according to the invention immobilized due to the addition of adhesive. This will make it possible to realize activated carbon strata which maintain their structure unlike activated carbon bulks even under mechanical stress and long periods of use; displacements and local compressions of the activated carbon particles which could lead to an impairment of the adsorption performance are avoided. Impairments of the adsorption performance are based, for example, on local faults in the bulk which may cause leakages. Due to the immobilization of the activated carbon particles in this embodiment according to the invention, the air permeability is higher than in bulks with activated carbon particles of comparable grain diameter. Furthermore, the immobilization of the activated carbon particles has the advantage that various geometries of the filtering device or the layers of the carrier medium and the activated carbon can be generated. Rectangular as well as non-rectangular cuts can be considered.

The immobilization of the activated carbon particles in the activated carbon stratum is obtained by adding adhesive, the adhesive threads of which adhere to the surface of the activated carbon particles and connect various activated carbon particles, however, without impairing the adsorption performance of the activated carbon. A reactive adhesive, for example, can be considered as adhesive, e.g. on the basis of polyurethane or silane. A thermoplastic adhesive, which is, for example, manufactured on the basis of polyolefins, is also possible.

The carrier medium is carrier of the activated carbon or abuts at least against the activated carbon stratum. The carrier medium is, for example, designed as carrier layer and/or carrier stratum, which ensures a mechanical filtration of particulate contamination of the gaseous fluid to be cleaned, if required. In this case, the carrier medium forms, for example, a carrier or filter fleece, on which contaminant particles can be separated, The filter fleece consists, for example, of polyester, polypropylene, 4, polyacrylonitrile or polycarbonate.

In the embodiment of the carrier medium as carrier stratum, the activated carbon forms an activated carbon layer, which is preferably connected with the carrier stratum via the adhesive, and which abuts directly on the carrier stratum. In this connection, a gluing of the activated carbon layer on the carrier stratum as well as the gluing by means of unset adhesive threads applied to the activated carbon can be considered. Thus, the carrier stratum defines the activated carbon layer at least on one side and is connected at the same time with the activated carbon layer.

This embodiment allows the formation of open layers of carrier stratum and activated carbon stratum with immobilized activated carbon layer. Such layers, which are called media layer and comprise a carrier stratum and an activated carbon stratum, can be stacked, wherein the through-flow direction is in stack direction, which means orthogonally to the plane of the layers. In a preferred embodiment, two media layers, which consist each of a carrier stratum and an activated carbon layer, are stacked in such a way that the activated carbon layers of both media layers abut directly; these two media layers form a stacking unit. Thus, two different activated carbon layers abut directly within an upper and a lower carrier stratum, when stacked. Such stacking units may be stacked further, if required, to obtain a desired total thickness of the filtering device with a corresponding filtration performance.

A further embodiment features several stacked media layers. Each media layer consists of a carrier stratum, an activated carbon layer, and a particle filter layer. An adhesive is introduced into the activated carbon layer in order to immobilize the activated carbon particles. The activated carbon layer is glued to the associated carrier stratum, with which the activated carbon layer forms the media layer, via the adhesive.

The particle filter layer can have a multi-layer design. Furthermore, the particle filter layer can be disposed either upstream or downstream of the activated carbon layers or also upstream and downstream of the activated carbon layers.

Two respective media layers are stacked in such a way that the activated carbon layers face each other. In this way, a stacking unit of two media layers is formed, which is defined by a carrier stratum and a particle filter layer, between which two directly abutting activated carbon layers are disposed.

In the example of an embodiment according to FIG. 2, the activated carbon layers can also be provided with a sealing on their front faces, which means on the width sides and the longitudinal sides. Directly superimposed activated carbon layers are advantageously not glued together, the sealing is rather realized only via the directly adjacent carrier stratum.

Furthermore, it is possible to combine easily different types of activated carbon per layer, for example different raw materials such as coconut, anthracite coal, charcoal or synthetic basic materials, different degrees of activation, different catalytic properties and different impregnations. This allows an adaptation to the target gas spectrum.

According to an alternative embodiment, the activated carbon layer is defined on both of its lateral surfaces by one carrier stratum; an intermediate activated carbon layer and two carrier strata form one media layer. Advantageously, the activated carbon layer is also glued with two carrier strata. A media layer or stacking unit consists therefore of two carrier strata and one intermediate activated carbon layer, wherein several stacking units may be stacked, if required.

Thanks to a different number of layers or stacking units, great heights with comparably small lengths and widths of the filtering device can also be realized, if required. The greater height goes hand in hand with longer dwell times and a better effective adsorption and leads to a longer service life of the activated carbon filter.

According to a further appropriate embodiment, the activated carbon layer is sealed at its longitudinal and/or width sides so that together with the carrier strata abutting on the lateral surfaces an all-round limitation of the activated carbon layer can be realized, if required. The sealing on the longitudinal and/or width sides enhances the stability and improves the safety against delamination and displacement in the activated carbon layer.

According to a further appropriate embodiment, the carrier medium is designed as open-pore foam, for example as a polyurethane foam, in which the activated carbon and the adhesive are incorporated. Embodiments can be considered in which, for the manufacturing of the filtering device, the adhesive is first introduced into the open-pore foam of the carrier medium and subsequently, the activated carbon is introduced. Another possible embodiment is to apply first the adhesive to the activated carbon and to introduce the mixture of activated carbon and adhesive into the open-pore foam of the carrier medium.

Besides the described folded filter layers, the filtering device can also be executed with flat filter layers, in particular as wound filter.

BRIEF DESCRIPTION OF THE DRAWINGS

Further advantages and appropriate embodiments can be taken from the claims, the description of the figures and the drawings. It is shown in:

EMBODIMENT(S) OF THE INVENTION

Figure 1:
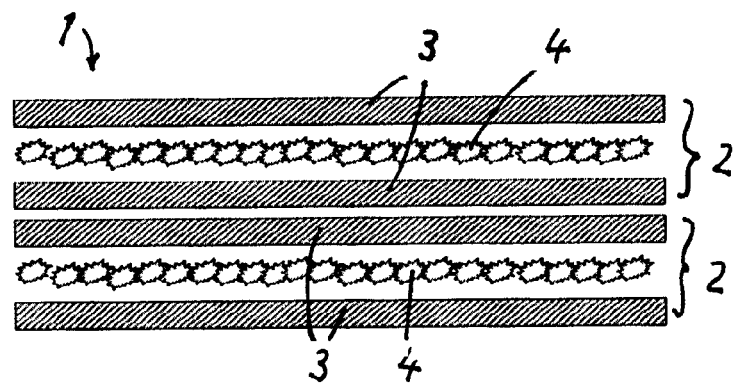
FIG. 1 a schematic diagram of a first filtering device that features activated carbon as adsorbent, with two stacked media layers, which consist each of two carrier strata with intermediate activated carbon layer.

FIG. 1 shows a filtering device 1 for filtering a gaseous medium, wherein via the filtering device 1 a mechanical as well as a chemical cleaning can be carried out. For example, the air to be supplied to a fuel cell can be cleaned via the filtering device 1 from contaminant particles and from chemical, gaseous substances.

The filtering device 1 features at least two stacked media layers 2, which consist each of two parallel carrier strata 3 and an intermediate activated carbon layer 4. The carrier strata 3 form each a filter fleece, which is used for particulate removal. The activated carbon layer 4 acts as adsorbent for the adsorption of volatile matters carried in the gas flow. The through-flow direction is orthogonal to the plane of the carrier strata 3 or the activated carbon layers 4.

The filter fleece of the carrier strata 3 consists, for example, of polyester, polyurethane, polyamide, polyacrylonitrile or polycarbonate. The activated carbon in the activated carbon layer 4 is solidified or immobilized by means of an adhesive, so that the individual activated carbon particles in the activated carbon layer are not able to move freely, but occupy a permanent place in the stratum. A reactive adhesive, for example on the basis of polyurethane, or a thermoplastic adhesive, for example on the basis of polyolefins, can be considered as adhesive. The adhesive features adhesive threads, which adhere to the surface of the activated carbon particles and thus ensure the adhesion.

The activated carbon layer 4 is furthermore bonded with both carrier strata 3, which is part of the respective media layer 2 and is located at the two lateral surfaces of the activated carbon layer 4. On the front faces, which means on the longitudinal and width sides, the activated carbon layer 4 can be provided with a sealing, which gives the activated carbon layer an additional stability and safety against delamination and displacement.

The individual media layers 2, which are stacked, may be either loosely stacked or also held together by gluing.

Where appropriate, the filtering device 1 may have more than two media layers 2.

Figure 2:
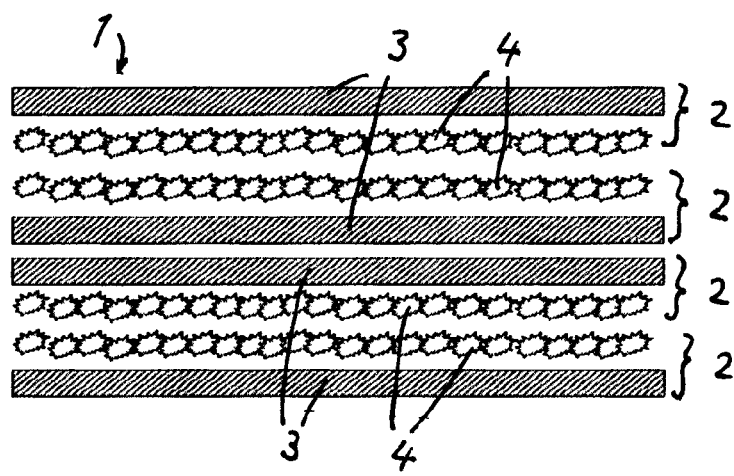
FIG. 2 a filtering device with different carrier strata and activated carbon layers in another embodiment.

In FIG. 2 is shown another example of an embodiment, in which the filtering device 1 features also several stacked media layers 2. Each media layer 2 consists of a carrier stratum 3 and an activated carbon layer 4. An adhesive is introduced into the activated carbon layer 4 in order to immobilize the activated carbon particles. The activated carbon layer 4 is glued to the associated carrier stratum 3, with which the activated carbon layer 4 forms the media layer 2, via the adhesive.

According to FIG. 2, two respective media layers 2 are stacked in such a way that the activated carbon layers 4 face each other. In this way, a stacking unit of two media layers 2 is formed, which is defined by an upper and a lower carrier stratum 3, between which two directly abutting activated carbon layers 4 are disposed. In the example of an embodiment according to FIG. 2, two such stacking units with two respective media layers 2 are stacked. Basically, more than two stacking units can be stacked.

In the example of an embodiment according to FIG. 2, the activated carbon layers can also be provided with a sealing on their front faces, which means on the width sides and the longitudinal sides. Directly superimposed activated carbon layers 4 are advantageously not glued together, the sealing is rather realized only via the directly adjacent carrier stratum 3.

Directly superimposed carrier strata 3 of the stacking units can, where appropriate, be connected with each other, for example by gluing.

According to another example of an embodiment, the filtering device 1 features also several stacked media layers 2. Each media layer 2 consists of a carrier stratum 3, an activated carbon layer 4, and a particle filter layer 5. An adhesive is introduced into the activated carbon layer 4 in order to immobilize the activated carbon particles. The activated carbon layer 4 is glued to the associated carrier stratum 3, with which the activated carbon layer 4 forms the media layer 2, via the adhesive.

The particle filter layer can have a multi-layer design. Furthermore, the particle filter layer 5 can be disposed either upstream or downstream of the activated carbon layer 4 or also upstream and downstream of the activated carbon layer 4.

Two respective media layers 2 are stacked in such a way that the activated carbon layers 4 face each other. In this way, a stacking unit of two media layers 2 is formed, which is defined by a carrier stratum 3 and a particle filter layer 5, between which two directly abutting activated carbon layers 4 are disposed.

In the example of an embodiment according to FIG. 2, the activated carbon layers can also be provided with a sealing on their front faces, which means on the width sides and the longitudinal sides. Directly superimposed activated carbon layers 4 are advantageously not glued together, the sealing is rather realized only via the directly adjacent carrier stratum 3.

We claim:

1. A filtering device for the air to be supplied to a fuel cell or for filtering pesticides, comprising:
   a first carrier medium;
   an activated carbon stratum as adsorbent arranged on the first carrier medium;
   an adhesive immobilizing individual particles of the activated carbon stratum together;
   wherein the adhesive bonds the activated carbon stratum onto a first face of the first carrier medium;
   a second carrier medium having a first face;
   wherein the first and second carrier medium are spaced apart on opposing sides of the activated carbon stratum;
   wherein the activated carbon stratum is not bonded to or glued to the second carrier medium;
   wherein the activated carbon stratum is arranged on and abutting directly onto the first face of the second carrier medium;
   wherein an opposing second face of the first and second carrier medium does not have an activated carbon stratum secured thereto.

2. The filtering device according to claim 1, further comprising:
   a third carrier medium arranged on and abutting directly onto the opposing second face of the first or second carrier medium;
   wherein the third carrier medium includes a third activated carbon stratum as adsorbent arranged on the third carrier medium with adhesive immobilizing individual particles of the activated carbon stratum together and bonding the third activated carbon stratum onto a first face of the third carrier medium;
   wherein the adhesive bonds the third activated carbon stratum onto a first face of the third carrier medium.

3. The filtering device according to claim 1, wherein the first carrier medium and/or the second carrier medium is a filter fleece medium operable to remove particulates from air flowing therethrough.

4. The filtering device according to claim 1, wherein only one lateral surface of the activated carbon stratum abuts on any carrier medium.

5. The filtering device according to claim 1, wherein
   wherein the adhesive is a thermoplastic adhesive manufactured on the basis of polyolefins.

6. The filtering device according to claim 1, wherein
   wherein the adhesive is a reactive adhesive on the basis of polyurethane or silane.

7. The filtering device according to claim 1, further comprising
   a particle filtering layer arranged on and abutting directly onto the second face of the first carrier medium or the second face of the second carrier medium.

8. A filtering device for the air to be supplied to a fuel cell or for filtering pesticides, comprising:
   a first carrier medium;
   an activated carbon stratum as adsorbent arranged on the first carrier medium;
   an adhesive immobilizing individual particles of the activated carbon stratum together;
   wherein the adhesive bonds the activated carbon stratum onto a first face of the first carrier medium;
   a second carrier medium having a first face;
   a second activated carbon stratum as adsorbent arranged on the second carrier medium;
   an adhesive immobilizing individual particles of the second activated carbon stratum together;
   wherein adhesive bonds the second activated carbon stratum onto a first face of the second carrier medium;
   wherein the first and second carrier medium are spaced apart on opposing sides of the activated carbon stratum;
   wherein the activated carbon stratum overlays and abuts directly onto the second activated carbon stratum;
   wherein the activated carbon stratum is not bonded to or glued to the second activated carbon stratum.

9. The filtering device according to claim 8, further comprising:
   a third carrier medium arranged on and abutting directly onto an opposing second face of the second carrier medium;
   wherein the third carrier medium includes a third activated carbon stratum as adsorbent arranged on the third carrier medium with adhesive immobilizing individual particles of the activated carbon stratum together and bonding the third activated carbon stratum onto a first face of the third carrier medium;
   wherein the carrier medium is a filter fleece operable to remove particulates from air flowing therethrough;
   wherein the filter fleece consists of any of: polyester, polypropylene, polyacrylonitrile or polycarbonate.

10. The filtering device according to claim 8, wherein
    wherein the adhesive is a reactive adhesive on the basis of polyurethane or silane.

11. The filtering device according to claim 8, wherein
    wherein the adhesive is a thermoplastic adhesive manufactured on the basis of polyolefins.

* * * * *